Dec. 16, 1969 G. E. FENNER 3,484,716
HIGH DUTY CYCLE LASER DEVICE
Filed Oct. 1, 1965

Inventor:
Gunther E. Fenner,
by John F. Ahern
His Attorney.

United States Patent Office 3,484,716

Patented Dec. 16, 1969

3,484,716

HIGH DUTY CYCLE LASER DEVICE

Gunther E. Fenner, Schenectady, N.Y., assignor to General Electric Company, a corporation of New York Filed Oct. 1, 1965, Ser. No. 492,181

Int. Cl. H01s *3/18*

U.S. Cl. 331—94.5 8 Claims

ABSTRACT OF THE DISCLOSURE

The duty cycle of a cylindrical semiconductor junction laser is lengthened by establishing a magnetic field directed longitudinally through the junction region. The magnetic field causes filaments of lasing in the junction to rotate throughout the entire junction region, thereby dispersing the heat generated by such filaments over the entire body of the laser and avoiding isolated spots of deleteriously high temperatures.

This invention relates to semiconductor junction lasers, and more particularly to a method and apparatus for increasing the duty cycle of a semiconductor junction laser at any ambient temperature.

Semiconductor junction lasers operated below the threshold of coherent light emission generally produce uniform light output across the junction. Above threshold, however, many junctions show filamentary behavior by confining light output to one or more narrow regions along the junction. These filaments are usually extended through the entire length of the junction between the mirror surfaces or Fabry-Perot faces defining the resonant cavity of the junction. Therefore, although in ideal operation a semiconductor junction laser emits light originating from the entire junction region, inhomogeneities in the crystal comprising the diode actually cause oscillation within the resonant cavity to take place preferentially along certain channels or filaments rather than uniformly throughout the cavity. Light output of such junctions is thus related to local current density in the vicinity of each filament.

Because of the confined region in which filaments of lasing occur, the high current density in each of the filaments produces extreme local heating which can rapidly destroy the diode if not quickly dissipated. This problem has heretofore been avoided usually by operating the diode in a periodic, rather than continuous mode. Thus, after a brief interval of heating in the vicinity of these filaments, the diode is allowed a brief interval in which to cool, permitting heat built up by the filaments of lasing to dissipate throughout the body of the diode before any particular point in the diode reaches a deleteriously high temperature. This problem has also been avoided by immersing the semiconductor junction laser in liquid air or liquid nitrogen for the purpose of maintaining the entire body of the diode below deleteriously high temperatures. However, neither of the aforementioned solutions to the problem of local heating due to filaments of lasing has permitted continuous operation of semiconductor junction lasers without requiring use of expensive cryogenic cooling apparatus.

The instant invention permits semiconductor junction laser diodes to be operated at room temperature, without expensive cooling apparatus, through a higher duty cycle than has heretofore been possible, and also permits continuous operation of gallium arsenide semiconductor junction lasers at non-cryogenic temperatures below room temperature, cryogenic temperatures being herein defined as temperatures below 80° K.

Accordingly, one object of this invention is to provide a semiconductor junction laser for high duty cycle operation at room temperature.

Another object is to provide a method and apparatus for continuously operating a semiconductor junction laser at non-cryogenic temperature.

Another object is to provide a method and apparatus for maintaining temperature within the region of filaments of lasing in a semiconductor junction laser diode at substantially the temperature of the remainder of the diode.

Another object is to provide a method and apparatus for evenly distributing throughout the body of a laser the heat generated by filaments of lasing therein.

Briefly stated, in accordance with one aspect of the invention, there is disclosed a method for operating a semiconductor laser having a junction region shaped substantially in the form of a hollow cylinder, on a high duty cycle. This method comprises the steps of passing pumping current through the laser junction and inducing a magnetic field through the junction directed perpendicularly to the pumping current flow. In this fashion, a force is produced on filaments of lasing which occur in the junction, and acts orthogonally to both the pumping current direction and magnetic field direction to cause rotation of the filaments throughout the entire junction region, thereby dispersing the heat generated by such filaments throughout the entire body of the laser.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Figures 1, 2, 3:
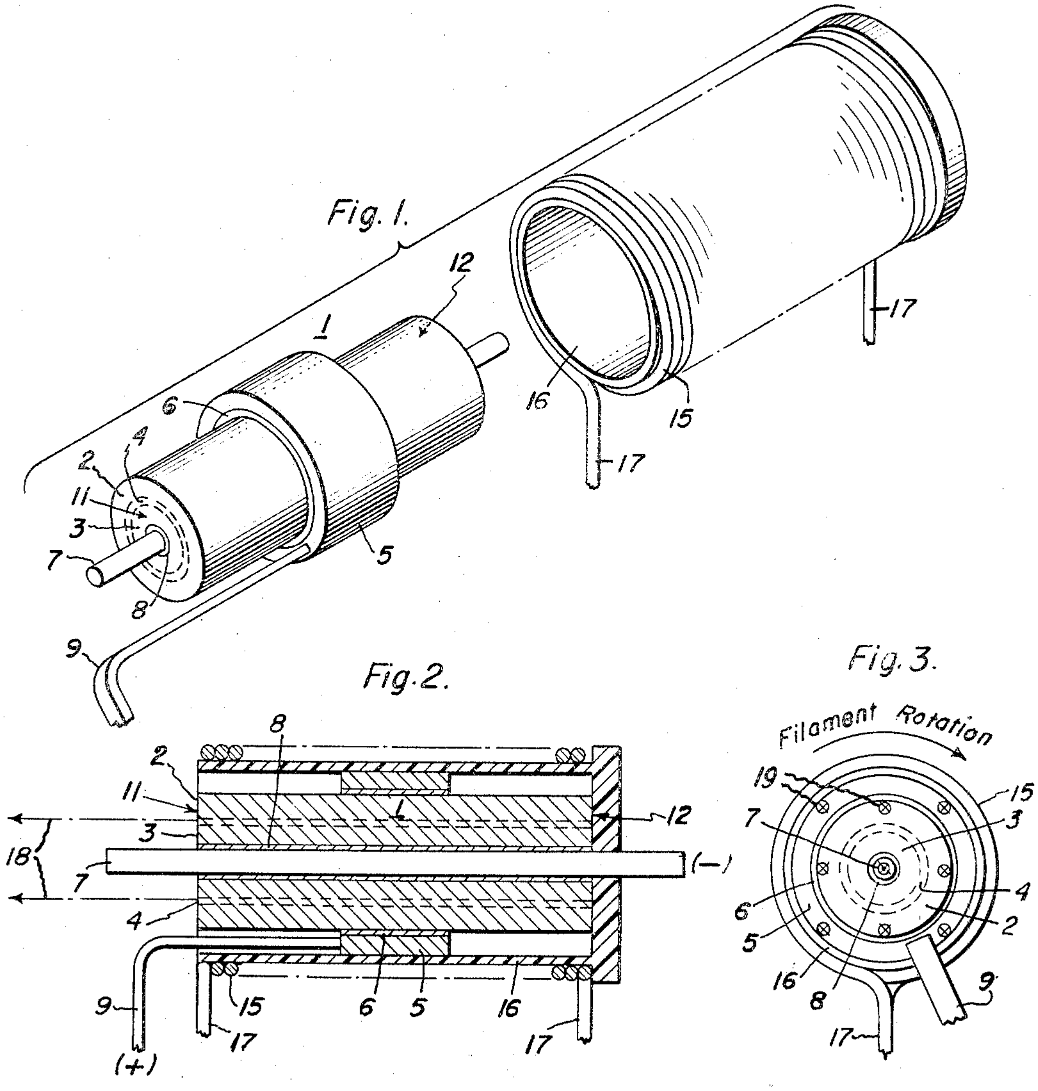
FIGURE 1 is an exploded view of a diode and cylindrical coil which may be utilized in the junction laser apparatus of the invention.
FIGURE 2 is a sectional view of the assembled apparatus of FIGURE 1.
FIGURE 3 is an end view of the light-emitting end of the apparatus of FIGURE 2, showing a magnetic field therein in schematic form.

FIGURE 1 of the drawings is an exploded view of a semiconductor junction laser constructed in accordance with the present invention. The laser is comprised of two major portions, a semiconductor junction diode 1, such as that disclosed in Robert N. Hall application, Ser. No. 232,846, filed Oct. 24, 1962, now Patent No. 3,245,002, issued Apr. 5, 1966 and assigned to the instant assignee, and magnetic field producing means, indicated generally as a cylindrically-wound coil 15. The diode comprises a crystal of semiconductive material having a degenerately impregnated or doped P-type region 2 and a degenerately impregnated or doped N-type region 3. The P-type and N-type regions are separated by a cylindrical P-N junction region 4. A nonrectifying connection is made between P-type region 2 and a contact 5 by means of an acceptor type or electrically neutral solder layer 6 and a nonrectifying connection is made between N-type region 3 and a first electrode 7 by means of a donor type or electrically neutral solder layer 8. A second electrode 9 is connected to contact 5 by, for example, welding, brazing, etc. By application of forward bias of sufficient magnitude to diode 1 through electrodes 9 and 7, the diode may be activated to emit stimulated coherent radiation. The semiconductor body is generally monocrystalline, and cut in such fashion that front surface 11 and rear surface 12 may be polished to exact parallelism in planes perpendicular to the longitudinal axis of junction region 4, so that the junction region assumes the shape of a right cylinder. This parallelism enables establishment of a longitudinal standing wave pattern within the semiconductor crystal for attainment of high efficiency coherent radiation.

The material from which semiconductor crystal 1 is cut may be composed in general of a compound semiconductor or an alloy of compound semiconductors from group III–V of the Periodic Table class which are denominated as direct transition semiconductors (i.e., adapted to direct transitions of electrons between valence and conduction bands) and may include, for example, gallium arsenide, indium antimonide, indium arsenide, indium phosphide, gallium antimonide and alloys therebetween, and may further include direct transitions alloys of other materials such as alloys of gallium arsenide and gallium phosphide (which is indirect by itself) in the range of zero to fifty atomic percent of gallium phosphide. Other suitable direct transition semiconductive materials include lead sulfide, lead selenide and lead telluride. In these materials indium is suitable as a donor and excess anions are suitable as acceptors. Wavelength of emitted radiation depends largely upon the band gap or energy difference between the conduction band and the valence band of the selective semiconductor.

Both the N-type and P-type regions of semiconductor crystal 1 are impregnated or doped with donor or acceptor activators, respectively, to cause degeneracy. Degeneracy in N-type material is usually obtainable when the excess negative conduction carrier concentration exceeds $10^{17}$ per cubic centimeter, which is sufficient to raise the Fermi level thereof to a value of energy higher than the minimum energy of the conduction band for the material. Degeneracy in P-type material is usually obtainable when the excess positive conduction carrier concentration exceeds $10^{18}$ per cubic centimeter, which is sufficient to depress the Fermi level thereof to a value of energy below the maximum energy of the valence band for the material. The Fermi level of an energy band diagram is that energy at which the probability of there being an electron present in a particular state is 0.5.

The materials suitable for rendering degenerately N-type and P-type the various semiconductors with which the devices of the present invention may be constructed depend upon the semiconductive material utilized and are not necessarily the same in each case, even though the materials may be of the same class. Thus, all of the group III–V periodic table compounds utilize sulphur, selenium and tellurium as donors and zinc, cadmium, mercury and magnesium as acceptors; on the other hand, the elements tin, germanium and silicon may serve either as donors or acceptors depending upon the particular semiconductor and the method of preparation. For example, in gallium antimonide grown from a stoichiometric melt they are all acceptors. In indium antimonide, tin is a donor, whereas germanium and silicon are acceptors. In the remaining direct transition semiconductors of the group III–V type, tin, germanium and silicon are all donors. Any donor and acceptor pair having sufficiently high solubilities in the material utilized to form crystal 1 may be used in establishing degenerately impregnated or doped regions 2 and 3 in the device of FIGURE 1.

Diode 1 may be constructed by cutting a length of 150–500 microns from a 200–400 micron diameter monocrystalline rod of N-type gallium arsenide which is impregnated or doped with approximately $10^{18}$ atoms per cubic centimeter of tellurium. A cylindrically-shaped P-N junction region is formed by diffusing zinc into the cylindrical surface of the rod at a temperature of approximately 850° C. for approximately two hours using an evacuated sealed quartz tube containing the gallium arsenide crystal and one milligram of zinc, thus producing a P-N junction region of approximately 1000 angstrom units in thickness at a distance of approximately 20 microns below the cylindrical surface of crystal 1. The front and rear surfaces of the crystal, which are perpendicular to the P-N junction, are then polished to optical smoothness and exact parallelism (i.e., parallelism of approximately ±0.1 micron). The cylindrical configuration of the diode precludes existence of transverse standing waves within the semiconductor crystal.

A hole is next drilled through the center of the rod, preferably by ultrasonic means, a silver wire 7 is pushed into the hole, and solder 8 makes nonrectifying contact to silver wire electrode 7. Outside contact 5, comprising a silver wire or foil, is attached to the crystal with acceptor solder 6, comprising an alloy of 3 percent by weight of zinc and the remainder of indium. Donor solder 8 is comprised of tin.

Preferably, the junction region of crystal 1 is maintained at a thickness of approximately 500 to 2,000 angstrom units. The minimum thickness is set by practical considerations, and may be any small but finite dimension which prevents appreciable quantum mechanical tunneling under forward bias. However, the maximum thickness of the junction layer should not exceed approximately twice the longer of the two minority charge carrier diffusion lengths on either side of the junction region.

Crystal 1 may be adapted to fit within the hollow interior of a longitudinal magnetic field producing means, such as a coil of wire 15. The coil, which is energized through leads 17, may be wound upon a bobbin 16 comprised of any of a large number of well-known materials commonly utilized for this purpose, such as Teflon, nylon, etc. Alternatively, the coil may be wound directly upon the cylindrical surface of the crystal. It is noted that if junction region 4 is assumed to have a radius of 100 microns, and a filament of 10 microns in width therein is to be displaced tangentially by 10 microns in approximately 10 microseconds, the strength of the magnetic field to be induced within the junction region is less than 3,000 gauss, a relatively modest value of flux density which is readily produced by either an electromagnet or permanent magnet enveloping the diode longitudinally, or by magnetic means having an air gap of sufficient width to accommodate the diode longitudinally therein.

FIGURE 2 is a sectional view of the assembled device of FIGURE 1, wherein like numerals indicate like portions thereof. Positive potential is supplied to electrode 9, and negative potential is supplied to electrode 7, thereby forward-biasing the diode to emit coherent radiation 18 from face 11. Because of the small physical dimensions of the device illustrated in FIGURE 2, any leads which are soldered or clamped to electrodes 7 and 9 also provide convenient support means for the device.

FIGURE 3 is an end view at surface 11 of the semiconductor junction laser, wherein like numerals indicate like portions thereof. With magnetic field 19 produced by coil 15 directed into the plane of the drawing, as indicated by encircled X's in FIGURE 3, clockwise rotation of the filaments of lasing is obtained.

In operation, the device of FIGURES 1–3 is subjected to high levels of direct current; for example, at room temperature this level may be from 50,000 to 100,000 amperes per square centimeter for a gallium arsenide diode. However, since the threshold for stimulated coherent light emission from a gallium arsenide diode is related to the temperature of the diode, it may be convenient to subject the diode to a low temperature approaching cryogenic levels in order to lower the threshold for coherent emission to approximately 2500 amperes per square centimeter and preclude the necessity of a high current source, while yet achieving continuous operation. Subjecting the diode to low cryogenic temperatures still further decreases the threshold for coherent emission.

Once coherent emission has been achieved and the magnetic field established through the diode, the filaments of lasing are rotated through the diode in the manner illustrated in FIGURE 3, due to interaction of the magnetic field with the junction current. Coil 15 is preferably energized from a direct current source in order to maintain a constant, unidirectional magnetic field which produces continuous rotation of the filaments of lasing at a uniform angular velocity. By rotating the filaments of lasing, isolated hot spots in the diode are avoided. Thus, although the diode operates at substantially the same average temperature regardless of whether or not a magnetic field is supplied thereto, heat within the diode is more evenly distributed, and isolated spots of deleteriously high temperatures are avoided. The filaments may be rotated in the reverse direction merely by reversing direction of magnetic flux passed longitudinally through junction region 4.

Figure 4:
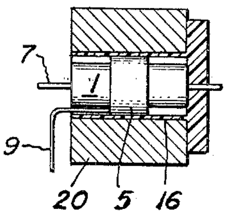
FIGURE 4 is a cutaway view of assembled apparatus comprising a second embodiment of the invention.

FIGURE 4 is a view of an assembled semiconductor junction laser substantially similar to that illustrated in FIGURE 2, with the exception that a permanent magnet 20, shown in section, is substituted on bobbin 16 for coil 15, although the magnet could alternatively be supported by the diode if preferred. The magnetic field required for operation is readily produced by the permanent magnet, since the requisite flux density is quite low. This device has the advantage of requiring less wiring than the device of FIGURES 1–3.

Figure 5:
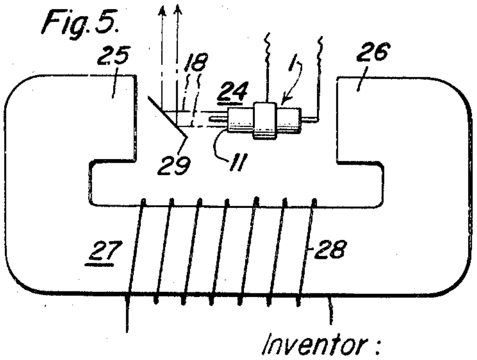
FIGURE 5 is a schematic drawing of a third embodiment of the invention.

FIGURE 5 illustrates a third embodiment of the invention wherein diode 1 is inserted longitudinally within an air gap 24 formed between poles 25 and 26 of an electromagnet 27, energized through a coil 28. A mirror 29 is situated between pole 25 and emitting face 11 of diode 1 in order to direct coherent light out of the air gap between the poles. Since the lines of magnetic flux which pass between poles 25 and 26 are directed longitudinally through diode 1, they are also directed longitudinally through the cylindrical junction region therein.

Because of the low magnetic flux density required for rotation of the filaments of lasing within diode 1, a permanent magnet of similar configuration may be substituted for electromagnet 27, thus obviating need for winding 28. However, when electromagnet 27 is utilized, winding 28 is preferably energized from a direct current source, in order to maintain a unidirectional magnetic field longitudinally through diode 1.

Operation of the embodiment of FIGURE 5 is identical to operation of the previous embodiments described herein. Regardless of whether the magnetic field is created from magnetic field producing means surrounding the diode or situated at either end of the diode, the field traverses the entire junction region, and, if maintained unidirectional, causes the filaments of lasing to continuously rotate therein. In this manner, a high duty cycle of operation is obtained.

Thus there has been shown a semiconductor junction laser for operation on a high duty cycle without excessive local heating in the region of the filaments of lasing. Local overheating is avoided by continuously changing the position of the filaments of lasing. In this fashion, the semiconductor junction laser may be operated on a high duty cycle at room temperature, and may be continuously operated without need for cryogenic cooling.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A semiconductor junction laser comprising a semiconductor diode of substantially cylindrical configuration, said diode having a P-N junction region therein shaped substantially in the form of a hollow cylinder to produce coherent emission of light, said emission arising at least in part from a filament of lasing established in said junction region, and means establishing a magnetic field directed longitudinally through said junction region in order to rotate said filament of lasing throughout said junction region.

2. The semiconductor junction laser of claim 1 wherein said means establishing a magnetic field comprises a cylindrically-shaped electromagnet aligned coaxially with the longitudinal axis of said diode.

3. The semiconductor junction laser of claim 1 wherein said means establishing a magnetic field comprises a cylindrically-shaped permanent magnet aligned coaxially with the longitudinal axis of said diode.

4. The semiconductor junction laser of claim 1 wherein said means establishing a magnetic field comprises a pair of magnetic pole pieces of opposite magnetic polarity spaced at opposite longitudinal ends of said diode.

5. The method of operating a laser pumped with electrical current and characterized by presence of a filament of lasing therein comprising injecting a pumping current into said laser, inducing a magnetic field within said laser and directing said field perpendicularly to the pumping current in order to move the location of said filament of lasing.

6. The method of operating the laser of claim 5 wherein said current and said magnetic field are each rendered unidirectional.

7. The method of operating a semiconductor junction laser characterized by presence of a filament of lasing within a junction shaped substantially in the form of a hollow cylinder, said method comprising the steps of passing pumping current radially through said junction and inducing a magnetic field longitudinally through said junction in order to rotate said filament of lasing throughout said junction.

8. The method of claim 7 wherein said magnetic field is rendered unidirectional.

References Cited

UNITED STATES PATENTS

| | | | |
|---|---|---|---|
| 3,059,117 | 10/1962 | Boyle et al. | 331—94.5 |
| 3,245,002 | 4/1966 | Hall | 331—94.5 |

RONALD L. WIBERT, Primary Examiner